(12) United States Patent
Smith et al.

(10) Patent No.: US 7,951,316 B2
(45) Date of Patent: May 31, 2011

(54) PROCESS FOR PIPE SEAL MANUFACTURE

(75) Inventors: Jeffrey M. Smith, Hinckley, OH (US);
Duane E. Peterson, Copley, OH (US);
Harold H. Seymour, Stow, OH (US)

(73) Assignee: ExxonMobil Chemical Patents Inc.,
Houston, TX (US)

( * ) Notice: Subject to any disclaimer, the term of this patent is extended or adjusted under 35 U.S.C. 154(b) by 1240 days.

(21) Appl. No.: 11/099,944

(22) Filed: Apr. 5, 2005

(65) Prior Publication Data
US 2006/0220272 A1 Oct. 5, 2006

(51) Int. Cl.
*B29C 65/02* (2006.01)
(52) U.S. Cl. ............ 264/210.1; 264/209.3; 264/210.2; 264/210.3; 264/212; 264/148; 264/149; 264/152
(58) Field of Classification Search .................. None
See application file for complete search history.

(56) References Cited

U.S. PATENT DOCUMENTS

| | | | |
|---|---|---|---|
| 3,026,569 A * | 3/1962 | Keller | 264/148 |
| 3,650,874 A | 3/1972 | Job et al. | |
| 3,685,546 A | 8/1972 | Sigmund | |
| 3,881,566 A | 5/1975 | Moore | |
| 3,949,045 A | 4/1976 | Hess et al. | |
| 4,130,535 A | 12/1978 | Coran et al. | |
| 4,207,135 A * | 6/1980 | Pavano | 156/502 |
| 4,311,628 A | 1/1982 | Abdou-Sabet et al. | |
| 4,319,950 A | 3/1982 | Sznopek et al. | |
| 4,329,193 A | 5/1982 | Sznopek | |
| 4,594,390 A | 6/1986 | Abdou-Sabet et al. | |
| 5,057,265 A * | 10/1991 | Kunert et al. | 264/511 |
| 5,099,888 A | 3/1992 | Valls, Jr. | |
| 5,173,234 A | 12/1992 | Figuereo | |
| 5,297,949 A | 3/1994 | Yokoi et al. | |
| 5,336,349 A | 8/1994 | Cornils | |
| 5,489,409 A * | 2/1996 | Koganezawa et al. | 264/167 |
| 5,507,994 A * | 4/1996 | Cornils et al. | 264/252 |
| 5,554,325 A | 9/1996 | Kotte | |
| 5,632,939 A * | 5/1997 | Ito et al. | 264/40.5 |
| 5,634,672 A | 6/1997 | Stack et al. | |

(Continued)

FOREIGN PATENT DOCUMENTS

CA 2 193 264 1/2007

(Continued)

OTHER PUBLICATIONS

Abdou-Sabet, S. et al., "*Dynamically Vulcanized Thermoplastic Elastomers*", Rubber Chemistry and Technology, vol. 69, No. 3, Jul.-Aug. 1996, pp. 476-494.

(Continued)

*Primary Examiner* — Edmund H. Lee
(74) *Attorney, Agent, or Firm* — Kevin M. Faulkner

(57) ABSTRACT

Process for forming an annular member by extruding a thermoplastic profiled strip at an elevated temperature. Prior to cooling the strip, the still-molten ends undergo in-line compression molding to form an annular member having a joint section. The cross-section of the annular member is continuous in the joint section and the remainder of the body. Preferably, the extrudate may contain a thermoplastic elastomer, more preferably a thermoplastic vulcanizate formed by a dynamic vulcanization process. During the extrusion and compression molding processes, the extrudate may be supported on a rotatable turntable, or alternately on a rotatable molding cylinder.

18 Claims, 4 Drawing Sheets

U.S. PATENT DOCUMENTS

| | | | |
|---|---|---|---|
| 5,672,660 A | 9/1997 | Medsker et al. | |
| 5,795,421 A * | 8/1998 | Takahashi et al. | 156/108 |
| 5,846,465 A * | 12/1998 | Tsujino et al. | 264/252 |
| 5,868,437 A | 2/1999 | Teague | |
| 5,936,038 A * | 8/1999 | Coran et al. | 525/142 |
| 6,066,697 A * | 5/2000 | Coran et al. | 525/193 |
| 6,082,741 A | 7/2000 | Gregoire | |
| 6,336,640 B1 | 1/2002 | Knapp | |
| 6,437,030 B1 * | 8/2002 | Coran et al. | 524/101 |
| 6,550,775 B2 | 4/2003 | Knapp | |
| 6,689,297 B1 | 2/2004 | Mizuta et al. | |
| 6,824,722 B1 * | 11/2004 | Cornils et al. | 264/259 |

FOREIGN PATENT DOCUMENTS

| | | | |
|---|---|---|---|
| DE | 2056460 | * | 5/1972 |
| DE | 196 16 911 | | 10/1996 |
| EP | 0 209 399 | | 1/1987 |
| EP | 0 212 851 | | 3/1987 |
| EP | 0414298 | * | 2/1991 |
| EP | 0540770 A1 | | 5/1993 |
| GB | 793 529 | | 10/1955 |
| GB | 1 486 608 | | 9/1977 |
| JP | 2001-280509 | * | 10/2001 |
| WO | WO 93/19927 | | 10/1993 |
| WO | WO 96/20248 | | 7/1996 |
| WO | WO 96/23823 | | 8/1996 |
| WO | WO 98/12240 | | 3/1998 |
| WO | WO 99/46330 | | 9/1999 |
| WO | WO 01/10950 | | 2/2001 |
| WO | WO 02/12775 | | 2/2002 |
| WO | WO 03/095538 | | 11/2003 |

OTHER PUBLICATIONS

Holden, G. et al., *Thermoplastic Elastomers*, (2nd Ed.), Ch. 3 (Hanser Publishers) (1996), pp.

* cited by examiner

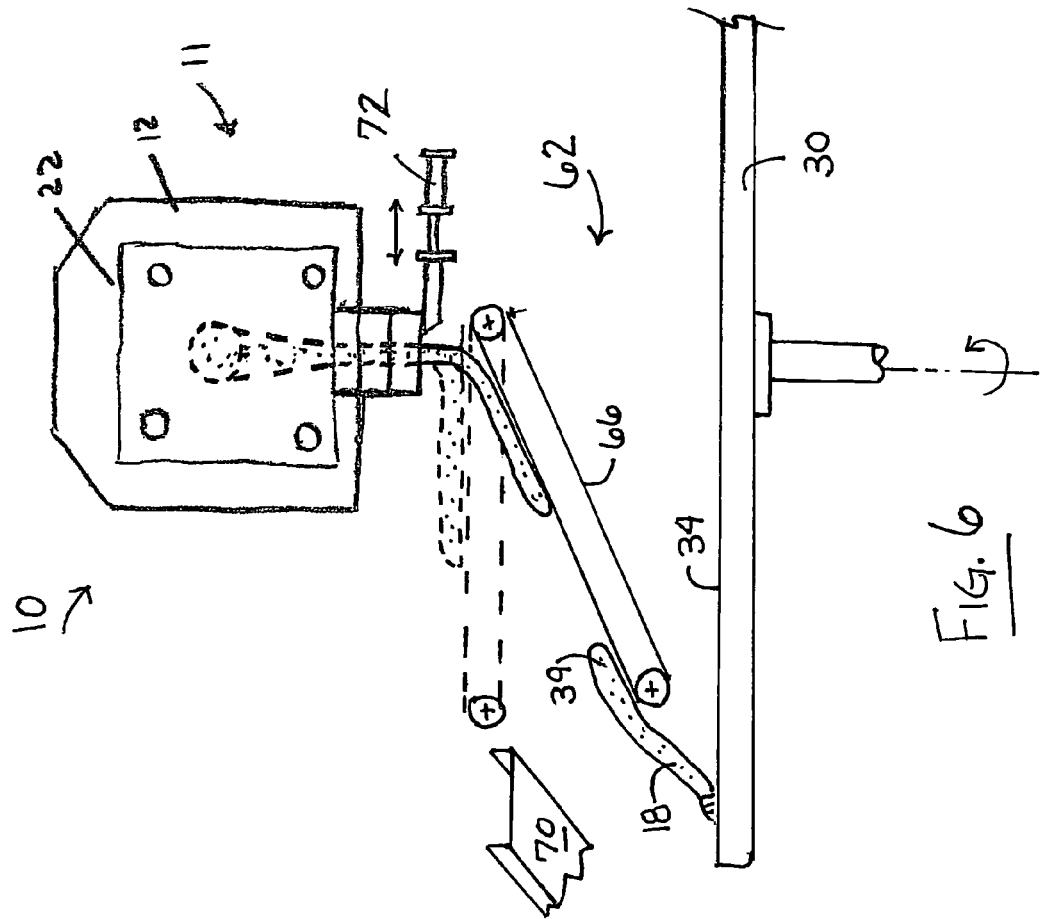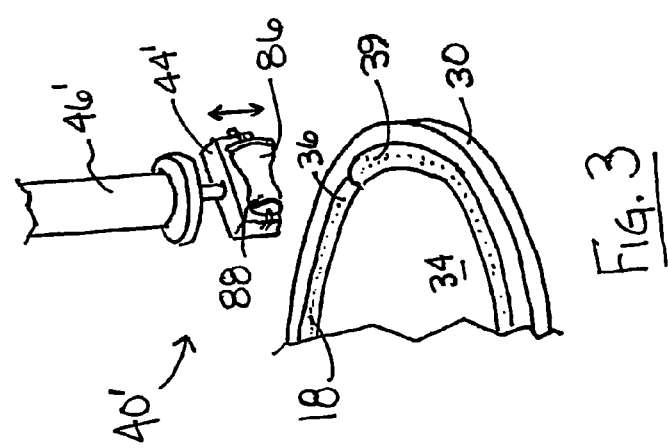

PROCESS FOR PIPE SEAL MANUFACTURE

FIELD OF INVENTION

The invention generally relates to a process for forming an annular member comprising one or more thermoplastics. The annular member thus formed is particularly useful in pipe seal applications.

BACKGROUND ART

In applications such as pipe seals, the governing specifications require the material to have a low compression set. Thermoset rubbers (TSR), those vulcanized or cross-linked after molding, have typically been used. Thermoplastics and thermoplastic elastomers have been proposed to replace TSR in many applications, particularly dynamically vulcanized thermoplastic elastomers, e.g., thermoplastic vulcanizates (TPV). A TPV typically consists of a vulcanized rubber particle phase dispersed within a continuous thermoplastic phase. Those currently proposed to meet typical pipe seal specifications are grades having a hardness of approximately 45-65 Shore A. To form a ring member from an extruded profile, there must necessarily be a joint or weld. The softer grades of TPVs do not always heat weld in a welding process with adequate strength as compared to a vulcanized splice in a TSR. This is often due in soft TPVs to the higher content of dispersed rubber phase and decreased content of hard thermoplastic. In addition, the joint or weld, can provide a leak path both during pressure and vacuum testing of the piping system and its subsequent use if the weld joint is not effective.

Seals for small pipe diameters (e.g., 12 inch diameter) can be prepared by injection molding which avoids a need for a weld. However, seals having large diameters (e.g., greater than 12 inch diameter) or with lower unit volume are not typically suitable for injection molding processes due to high tooling and equipment costs. Instead, extruded seal material profiles are cut to length, formed into a ring, and then welded or joined through a thermal welding process or vulcanized splicing. Thus there exists a need in the art for an improved process to provide larger diameter pipe seals that can be fabricated from thermoplastic materials.

In the thermal welding process excess thermoplastic extends upon joining of the ends thus causing leaking or substandard seal performance. Thus, the heat-welded joint of thermoplastic, particularly thermoplastic elastomer, has substandard performance with respect to the thermoset rubber seals that utilize a vulcanized splice with little excess. Thus TPE seals have been inadequate for more demanding applications such as sewer pipes due to weld quality and long-term performance. The present invention is directed to overcoming these and other problems.

DISCLOSURE OF INVENTION

In accordance with an exemplary form of the present invention there is provided a process comprising extruding a strip of molten thermoplastic material through an extrusion die wherein the strip has a generally continuous cross-sectional profile and a leading end and a trailing end. Subsequent to extruding the strip and without substantially cooling the strip, the leading end and the trailing end are joined to form a joint there between by compression molding of the leading and trailing ends at a temperature sufficiently high to allow plastic flow in the area of the joint. The extrusion process imparts a predetermined cross-sectional profile to the extrudate. During the compression molding, the mold imparts the predetermined cross-sectional profile to the joint section.

In exemplary embodiments, the thermoplastic material may comprise one or more of engineering thermoplastics, thermoplastic elastomers (TPE), and mixtures thereof. Particular suitable thermoplastic materials will include dynamically vulcanized TPE, or thermoplastic vulcanizate (TPV). Particularly suitable are the polyolefin TPV compounds comprising at least one non-crosslinked polyolefin thermoplastic phase and at least one cross-linked polyolefin rubber phase. Other suitable thermoplastics include the thermoplastic polyolefins (TPO) without a cross-linked phase, such as homopolymers of ethylene or propylene, or copolymers with each together, and copolymers of ethylene or propylene, or together, with other polymerizable $C_4$-$C_8$ comonomers; styrene block copolymers (SBC) and blends of such copolymers, both those considered thermoplastic and those exhibiting the properties of thermoplastic elastomers; and blends of polyolefins, or blends of one or more of them, with SBC copolymers. Thermoplastic polyurethane elastomers will also be suitable, alone or in blends.

An exemplary process comprises extruding the thermoplastic material (or even one or more coextruded thermoplastics, optionally with the TPE) at an elevated temperature onto a movable fixture; interrupting the extruding of the material; moving the fixture so as to bring the leading end of the extrudate to a predetermined relationship to the trailing end; and, before said trailing end cools to a predetermined cooled temperature, engaging the leading end and the trailing end in a mold under pressure to form a joint section in order to form an annular member of the thermoplastic material. In this exemplary process a shaped extrusion die imparts a predetermined profile to the extrudate and the mold imparts the predetermined profile in the joint section. The annular member thus formed may be adapted to provide a generally fluid tight seal between adjacent fluid carrying conduits. The use of a coextruded outer thermoplastic plus an inner thermoplastic elastomer provides for a stiffer profile, more dimensionally stable shape, even at higher use temperatures, while retaining the sealing capabilities of the thermoplastic elastomer.

In some embodiments the movable fixture may include a rotating planar surface onto which the extrudate is positioned. The planar surface may be rotated to bring the leading end of the extrudate into engaged relationship with the trailing end. Alternately, the movable fixture may include a rotatable molding cylinder having an outer deposit-receiving surface. The extrudate can be directed onto the surface as the molding cylinder rotates so that the leading end of the extrudate may be brought into engaged relationship with the trailing end.

An exemplary apparatus includes an extruder having an exit die for forming a polymer extrudate having a leading end, an implement for severing later extruded polymer extrudate to create a trailing end, a rotatable fixture having a deposit-receiving surface for receiving the polymer extrudate and a compression molding mechanism. The rotatable fixture is operable to return the leading end of extrudate to a position in contact with the trailing end. The compression molding mechanism is adapted to cooperate with the rotatable fixture to form a joint in the polymer extrudate at a position where the leading end and trailing end are in contact.

By using a thermoplastic extruder, and specialized downstream equipment, continuous seals can be produced with superior spliced joints, automatically, and in-line with the extrusion process.

One advantage of exemplary forms of the present invention is that enhanced performance TPVs can replace TSRs to form large diameter pipe seals.

Another advantage of exemplary embodiments is that the splicing operation is completed without the time or energy expenditures required in vulcanization of TSRs.

Another advantage of exemplary embodiments is that the quality of the spliced joint is improved as compared to heat welding because the operation is performed on the molten TPV prior to significant cooling. The joints may exhibit superior strength and minimal flashing as compared to standard hot plate welding on TPVs.

Another advantage of exemplary embodiments is the reduced tooling and equipment costs as compared to an injection molding process. For example, one extrusion die may be capable of producing seals for several sizes of pipe.

Still other advantages of exemplary embodiments of the present invention will be apparent to those having skill in the art upon a reading and understanding of the specification.

BRIEF DESCRIPTION OF THE DRAWINGS

FIG. 3 is a partial schematic view of an alternate exemplary embodiment of a compression molding station;

FIG. 6 is a partial front view of the alternate exemplary embodiment of an extrusion station; shown in FIG. 1;

BEST MODES FOR CARRYING OUT INVENTION

Definitions

Figure 1:
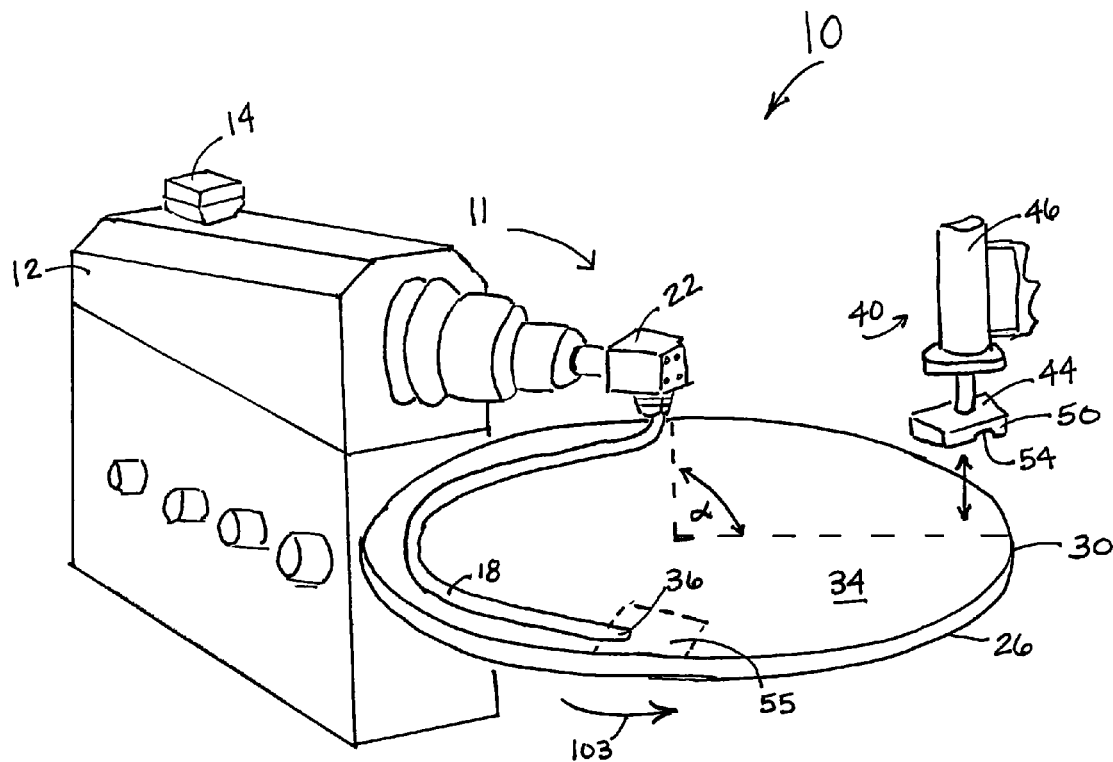
FIG. 1 is a schematic perspective view of an exemplary embodiment of an apparatus for carrying out an exemplary process for producing an annular seal using a rotatable turntable.
Figure 2:
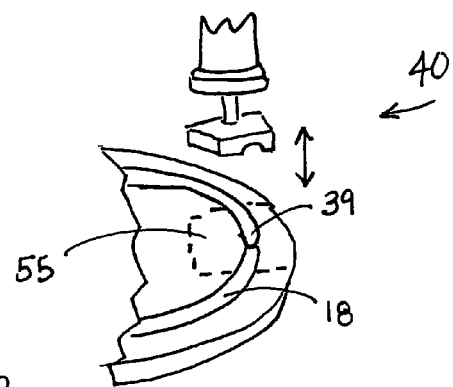
FIG. 2 is a partial schematic view of a compression molding station prior to a molding step.

Thermoplastic Elastomer (TPE): a diverse family of rubber like materials that, unlike conventional vulcanized rubbers, can be processed and recycled like thermoplastic materials. Typical examples include blends of "hard" crystalline, semi-crystalline, or glassy polymers (for instance those having a $T_m$ greater than about 110° C. or $T_g$ greater than about 60° C., as measured by differential scanning calorimetry (DSC), more preferably with amorphous or low-crystallinity polymers ($T_m$ less than about 90° C. or $T_g$ less than 60° C. by DSC). Examples of hard polymers include the non-polar and polar engineering resins such as polypropylene, polyethylene, polyamide, polycarbonate, and polyester resins. The "soft" polymers include most rubbers, particularly the non-polar olefin rubbers, for hard polyolefins, and polar rubbers for polar hard resins. Non-polar rubbers include ethylene-propylene rubber, very low density polyethylene copolymers comprising $C_4$ to $C_8$ α-olefin or vinyl aromatic comonomers, butyl rubber, natural rubber, styrene-butadiene rubber butadiene rubber, butadiene rubber and the like. Compatibilizing block copolymers and/or functionalized polymers are often used to improve overall engineering properties where incompatibility may exist as in blends of apolar and polar polymers.

Thermoplastic Vulcanizate (TPV): a thermoplastic elastomer with a chemically crosslinked rubbery phase, produced by dynamic vulcanization; TPVs provide functional performance and properties similar to conventional thermoset rubber products, but can be processed with the speed, efficiency and economy of thermoplastics; in addition to simpler processing, principal advantages of TPVs compared to thermoset rubber products include easier recycling of scrap and closer, more economical control of dimensions and product quality.

Dynamic Vulcanization: the process of intimate melt mixing a thermoplastic polymer and a suitable vulcanizable rubbery polymer with a cross-linking or vulcanization agent to generate a thermoplastic elastomer with a chemically crosslinked rubbery phase, resulting in properties closer to those of a thermoset rubber when compared to the same uncrosslinked composition. Thermoplastic vulcanizates and processes for preparing them are well known in the art, see for example, U.S. Pat. Nos. 4,130,535, 4,311,628, 4,594,390, and 5,672,660, and "Dynamically Vulcanized Thermoplastic Elastomers", S. Abdou-Sabet, et al, *Rubber Chemistry and Technology*, Vol. 69, No. 3, Jul.-Aug. 1996, and references cited therein.

Styrene Block Copolymers: the SBC thermoplastics and thermoplastic elastomers useful in the invention are block copolymers of styrene/conjugated diene/styrene, with the conjugated diene optionally being fully or partially hydrogenated, or mixtures thereof. Generally this block copolymer may contain 10 to 50 weight %, more preferably 25 to 35 weight %, of styrene and 90 to 50 weight %, more preferably 75 to 35 weight % of the conjugated diene, based on said block copolymer. Most preferred, however, is a block copolymer which contains 28 to 35 weight % of styrene and 68 to 72 weight % of the conjugated diene. The conjugated diene is selected from butadiene, isoprene or mixtures thereof. Block copolymers of the styrene/conjugated diene/styrene type are SBS, SIS, SIBS, SEBS and SEPS, and SEEPS block copolymers.

These block copolymers useful are known in the art, and are further described in Canadian Pat. No. 2,193,264 and in International Pat. Applications WO 96/20248; WO 96/23823; WO 98/12240; and WO 99/46330. They are generally prepared by butyl lithium initiated sequential anionic polymerization, but coupling of living S-B/S diblocks or bifunctional initiation are also known methods. See, in general, *Thermoplastic Elastomers* (2nd Ed.), Ch. 3, G. Holden, N. Legge, et al (Hanser Publishers, 1996).

Thermoplastic Polyurethane: another suitable thermoplastic is thermoplastic polyurethane (TPU) prepared from substantially difunctional ingredients, i.e. organic diisocyanates and components being substantially difunctional in active hydrogen containing groups, particularly those that have at least one major Tg of less than 60° C. However, often minor proportions of ingredients with functionalities higher than two may be employed. This is particularly true when using extenders such as glycerol, trimethylol propane, and the like. Any of the TPU materials known in the art within this description can be employed within the scope of the present invention. The preferred TPU is a polymer prepared from a mixture comprising at least one organic diisocyanate, at least one polymeric diol and at least one difunctional extender. The TPU can be prepared by prepolymer, quasi-prepolymer or one-shot methods commonly used in the art, see International Pat. Application No. WO 01 10950 (A1) (above) and references cited therein. Thermoplastic vulcanizates comprising TPU, both high and low Tg TPU's are also suitable.

FIGS. 1-5 illustrate a first exemplary embodiment of an apparatus 10 including an extrusion station 11 wherein a thermoplastic extruder 12 receives raw material from a feed hopper 14 in order to form extrudate 18. Extrudate 18 may be chosen from the general class of thermoplastic elastomers (TPE) or can be a thermoplastic vulcanizate (TPV) produced by dynamic vulcanization. To meet engineering objectives of tight fit and effective sealing, the thermoplastic material in the sealing portion of the profile typically will have a Shore D hardness of not greater than 50. The thermoplastic elastomeric materials utilized in an exemplary form of the present invention include various grades of Santoprene® thermoplastic elastomers available from Advanced Elastomer Systems, Akron, Ohio. Exemplary grade designations include Santoprene® 101-55; Santoprene® 101-73; and Santoprene® 103-50.

In this exemplary embodiment, molten material flows through an extrusion head 22 and is positioned onto a movable fixture 26 having a rotatable turntable 30. Turntable 30 includes a generally planar deposit-receiving surface 34. In this exemplary embodiment, the positioning and rotational speed of the turntable 30 is controlled relative to the flow from the extrusion head 22 to provide a continuous extrudate having a leading end 36. In this exemplary embodiment, apparatus 10 further includes an implement such as knife (not shown) for interrupting the flow from the extrusion head 22 to create a trailing end 39 of extrudate 18.

The extrusion process imparts a predetermined cross-sectional profile to extrudate 18. In this exemplary embodiment, the molten extrudate 18 is able to generally retain a predetermined three-dimensional shape during the extrusion process while turntable 30 is rotated.

As best seen in FIG. 1, apparatus 10 of this exemplary embodiment further includes a compression molding station 40 for in-line compression molding of still-molten extrudate 18. In this exemplary embodiment, the compression molding station 40 includes a molding fixture 44 that is movable toward and away from planar surface 34 through operation of a linear movement mechanism 46 such as a hydraulic mechanism, a pneumatic mechanism, or other suitable means. Movable fixture 44 includes a mold section 50 having a molding cavity 54 adapted to mate with the formed extrudate 18, although the cavity 54 may be slightly undersized, from 5% to 10%, for adequate compression.

With reference again to FIG. 1, an exemplary process utilizes a rotatable turntable 30 to support molten extrudate 18. The turntable 30 is positioned under an extrusion head 22 in order to receive material as it exits the extruder 12. In a controlled manner, the material, including leading end 36, is extruded onto the turntable 30 as it rotates in the direction of arrow 103. After a predetermined amount of material has been extruded, an implement or knife is employed to create trailing end 39. The amount of material extruded is sufficient to bring trailing end 39 into close proximity or overlapping relationship to leading end 36 upon rotation of turntable 30 substantially 360°. After the turntable 30 completes a rotation, a molding region 55 (shown in phantom) of the turntable 30, which supports leading end 36 and trailing end 39, is positioned at the compression molding station 40. In this exemplary process, extrudate 18 is not removed from turntable 30 as the leading and trailing ends are joined. In the exemplary process, the molten extrudate 18 is dimensionally stable even at temperatures above the melt temperature of the material. Thus, the predetermined cross-sectional profile of the extrudate 18 is retained during this exemplary process.

In this exemplary embodiment, when sufficient volume of extrudate 18 is deposited onto surface 34 so that trailing end 39 meets leading end 36, turntable 30 is repositioned to place molding region 55 at the compression molding station 40 by rotating turntable 30 a predetermined indexed arc α.

Figure 4:
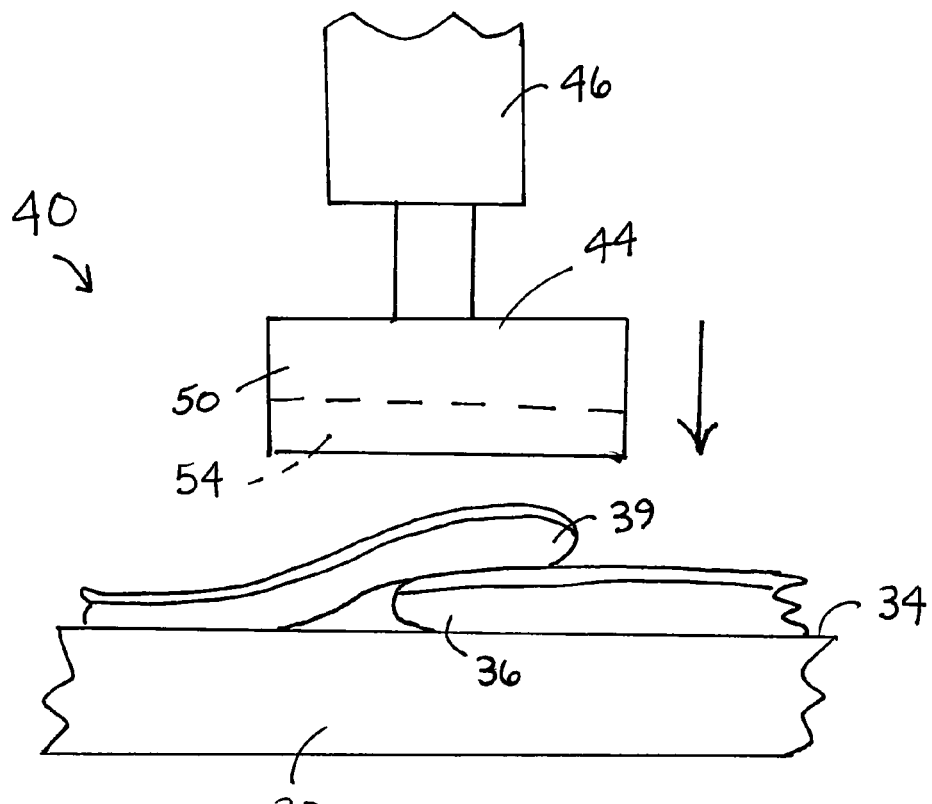
FIG. 4 is a partial front view illustrating an exemplary compression molding station prior to a molding step.
Figure 5:
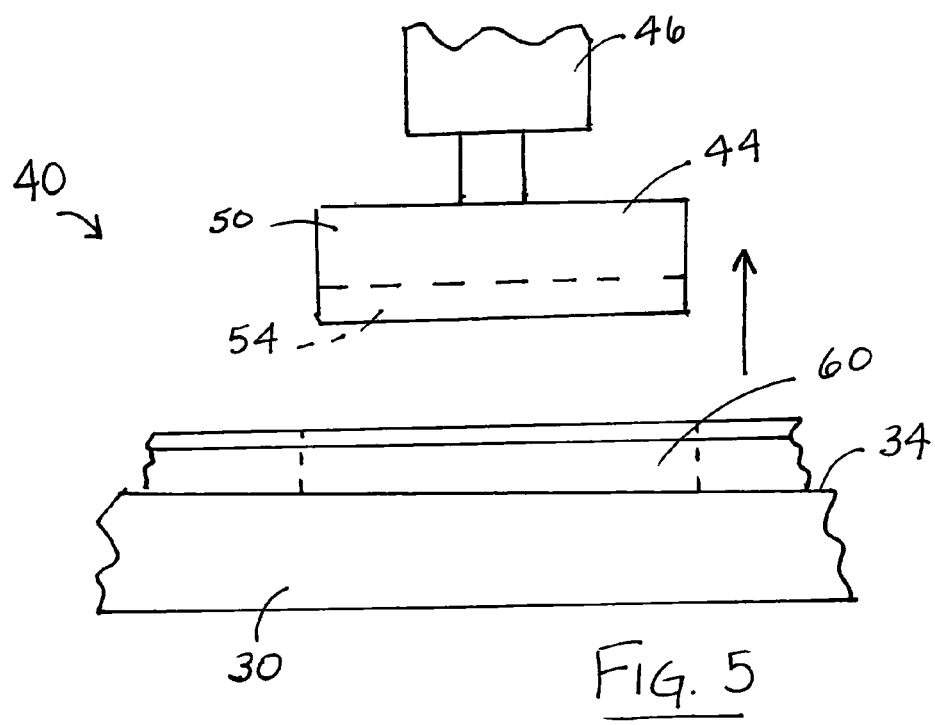
FIG. 5 is a partial front view illustrating an exemplary compression molding station after a molding step.

FIGS. 4 and 5 are particularly directed to the compression molding process. At the compression molding station 40, the molding fixture 44 is moved via linear movement apparatus 46 toward surface 34 to engage leading end 36 and trailing end 39, under pressure, with mold section 50 in order to form joint 60 in the still molten extrudate 18. Molding cavity 54 imparts a predetermined cross-sectional profile to joint 60, which is preferably substantially similar to the cross-sectional profile of the remainder of extrudate 18.

The ring member thus formed is allowed to cool to a predetermined temperature and is then removed from the turntable 30. The turntable 30 is then recycled back to a predetermined position at the extrusion station 10. In this exemplary process, repositioning turntable 30 is accomplished by another rotation step.

In a second exemplary embodiment, positioning the turntable 30 at a compression molding station 40 comprises a physical transfer of the turntable 30. In this exemplary process, another turntable 30 may be positioned under the extrusion head 22 to receive a fresh extrudate stream while the first extrudate stream undergoes the compression molding step. The use of more than one turntable 30 may be preferable to obtain a more efficient production system.

For ease of processing, the flow of extrudate may be only momentarily interrupted in order to create trailing end 39 and position turntable 30 at the compression molding station. Thus, in another exemplary embodiment, illustrated in FIG. 6, apparatus 10 may include a melt diverting system generally denoted 62.

In this exemplary embodiment, melt diverting system 62 includes a conveyor 66 for directing the flow of extrudate 18. The melt diverting system includes an implement such as knife 38' for momentary interruption of the flow of material in order to create a trailing end 39 of extrudate 18. After a brief interruption, the flow of material is resumed. Because there may be a time lag until a turntable 30 is properly positioned to receive the extrudate, excess material is diverted to a collection site 70. In the exemplary embodiment, the conveyor 66 is movable such that excess material carried thereon may be diverted away from turntable 30 to collection site 70. In the exemplary embodiment, the chosen material may be readily recycled from the collection site 70.

Knife 72 and conveyer 66 operate in coordinated movement with extruder 12 and turntable 30 to deliver a predetermined amount of material to surface 34. After the predetermined volume of material has been delivered, the molding region 55 of turntable 30 is positioned at compression molding station 40 while the flow of material is diverted. When a turntable 30 is again positioned at the extrusion station 11, the flow of material is interrupted again, in order to create a leading end of fresh extrudate to be deposited onto surface 34. Conveyor 66 is re-positioned in order to deliver extrudate to surface 34, and the process is repeated. Additional fixturing (not shown) may be employed to accurately guide the extrudate 18 into a desired position. The nature of the exemplary thermoplastic elastomeric material allows for the collection and in-line recycling of the scrap or flash created during the exemplary processes. Thus, the overall scrap rate can be minimized.

Various configurations of a molding station may be utilized. For example, FIG. 3 illustrates an alternate embodiment of molding station 40'. In this exemplary embodiment, molding fixture 44' includes a shaping pinion roller 86 having a rotatable shaped surface 88 adapted to mate with the formed extrudate 18. As in a previously described embodiment, the molding fixture 44' is movable toward and away from surface 34 via operation of linear movement apparatus 46'. Pinion roller 86 operates to engage leading end 36 and trailing end 39 to form a joint in the still-molten extrudate 18.

Figure 7:
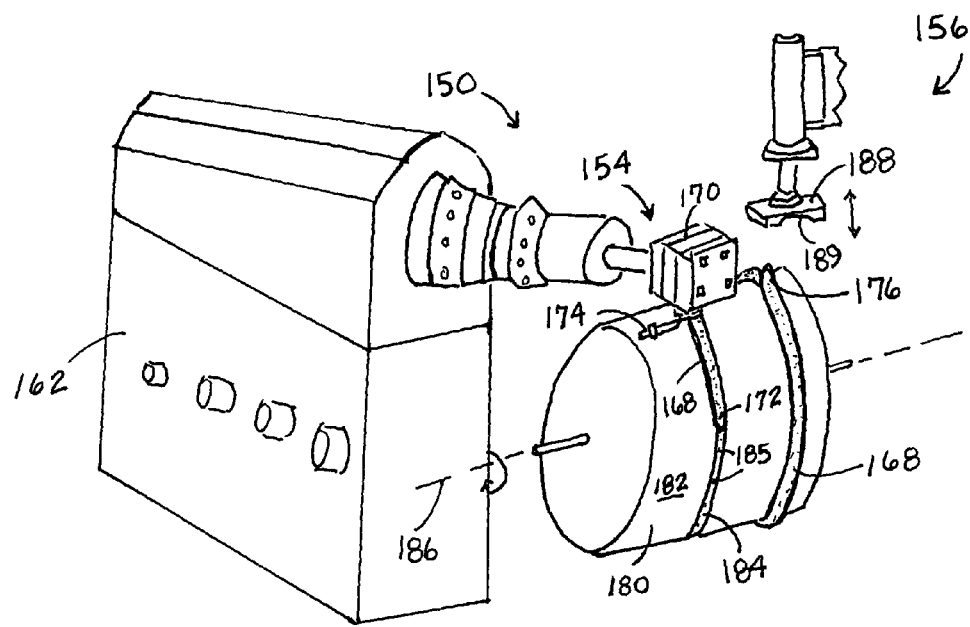
FIG. 7 is a schematic perspective view of an exemplary embodiment of an apparatus utilizing a rotating cylinder to receive the molten extrudate.

In another exemplary embodiment, illustrated in FIG. 7, an apparatus 150 for producing annular thermoplastic members includes an extrusion station 154 and a compression molding station 156. The extrusion station 154 includes a thermoplastic extruder 162 that utilizes an exit die 170 to form and shape an extrudate 168 having a leading end 172 in a manner similar to those described in previous embodiments. An implement or knife 174 may be positioned adjacent exit die 170 to interrupt the extrudate stream and create trailing end 176.

A rotatable molding cylinder 180 includes a deposit-receiving outer surface 182 operable to receive and support molten extrudate 168. The outer surface 182 may include one or more locating and shaping grooves 184. Molding cylinder 180 may further include vacuum holes 185 formed in groove 184 for enhanced retention of the extrudate on the rotating cylinder.

In this exemplary embodiment, the molding cylinder 180 is further adapted for reciprocal movement along its longitudinal axis 186. In this embodiment, a first compression molding station 156 is spaced from the extrusion station 154 such that reciprocal movement of the molding cylinder 180 is operable to move the extrudate 168 from the extrusion station 154 to the compression molding station 156 without removal of the extrudate 168 from the deposit-receiving outer surface 182. In this exemplary embodiment, cylinder 180 may receive a plurality of extrudate streams to be compression molded. Thus, reciprocal movement of cylinder 180 must be sufficient to allow each extrudate stream to be positioned at the first compression molding station 156. Alternately, additional compression molding stations may be utilized to accommodate a plurality of extrudate streams.

The first compression molding station 156 includes a mold section 188 movable toward and away from molding cylinder 180 in a radial direction via operation of a linear movement apparatus in a manner similar to that described in previous embodiments. Mold section 188 includes a molding cavity 189 adapted to mate with the formed extrudate 168, although the cavity 189 may be slightly undersized, from 5% to 10%, for adequate compression of the extrudate 168 into the mold section 188.

Figure 8:
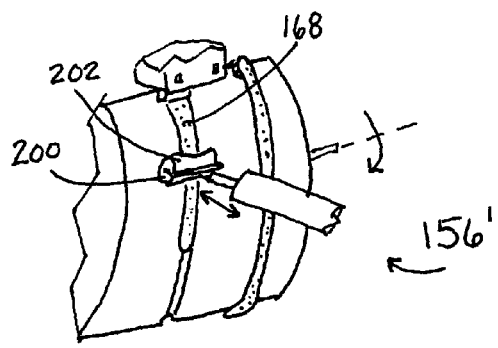
FIG. 8 is a partial schematic perspective view of an apparatus showing an alternate embodiment of a compression molding station.

An alternate embodiment of a compression molding station 156' is illustrated in FIG. 8. In this exemplary embodiment, a shaping pinion roller 200 is movable toward and away from molding cylinder 180 in a radial direction. As in previously described embodiments, shaping pinion roller 200 includes a profiled surface 202 adapted to mate with the formed extrudate 168. Pinion roller 200 is operable to form a joint in extrudate 168 at a position where the leading end 172 meets trailing end 176. In other exemplary embodiments, shaping pinion roller 200 may be continuously engaged with the extrudate 168 as cylinder 180 rotates to provide a three-dimensional feature to the formed extrudate 168 in addition to forming a joint.

The nature of the thermoplastic elastomeric material allows for this type of automated production. The molten thermoplastic elastomer, unlike most thermoplastics, retains its shaped profile during the extrusion process. In the compression molding process, the molten extrudate can be readily molded to form the joint, without the need for a vulcanization step as necessary for thermoset material. Additionally, the formed ring member does not have to cool for an extended period of time before it can be removed from the molding cylinder.

An alternate embodiment of a rotatable molding cylinder 180 replaces this fixture with the fluid carrying conduit or pipe. In this embodiment the conduit is rotated under the extruder exit die along a longitudinal axis so that the leading end engages the pipe in the final installed location, typically on the spigot end, and the subsequent extrudate is wrapped around the conduit until the trailing end is severed and positioned in proximity to the leading end. A shaping roller may be utilized to further improve thermal adhesion between the extrudate and the conduit surface. The leading and trailing ends of the extrudate are then compression molded or roll formed as described in previous embodiments. The seal is then allowed to cool in place, where the natural shrinkage improves seal to conduit adhesion and provides an additional interference fit.

In yet another exemplary embodiment a second thermoplastic material may be utilized to improve adhesion between the extrudate and the conduit. This process includes an apparatus adapted for co-extrusion. A first extruder applies a first material to exit die 22 while a second extruder applies a second material to the same extrusion die. The extrusion die is adapted with specially designed flow channels that allow both materials to exit the die in a laminar flow so that the extrudate appears as a single part with two distinctive materials of similar or varied physical properties and/or chemical properties in different cross-sectional areas. This embodiment comprising multiple materials (2 or more) formed into an annular member, joined at the ends, and cooled may be practiced with each of the embodiments described.

Typical designs for gaskets that are currently used in this field are described in the following U.S. Pat. Nos.; 6,336,640, and 6,550,775B2. These patents reference gasket having one or more materials as previously described In the described exemplary embodiments, the compression-molding process occurs while the extrudate is still in a molten state. In an exemplary process, the extrudate temperature should be in excess of 375° F. (190° C.), for typical polyolefin-based TPV materials, to prevent visible flow lines. It has been discovered that the temperature of the mold section affects the finished quality of the joint section. Thus, using anodized aluminum tooling, the mold section should be utilized at a temperature less than about 250° F. (120° C.) to prevent sticking and deformation of the extrudate. Sufficient pressure should be added to the mold section to minimize a parting line. Successful trials were accomplished using a minimum of 1500 PSI (10.3 mPa) on the projected area of the splice. The mold section can be moved away from the formed ring member after sufficient cooling. It has been found that cooling to 180° F. (80° C.) provides ample cooling.

Thus the exemplary apparatus and processes for forming an annular pipe seal achieve the above stated objectives.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

The invention claimed is:

1. A process comprising:
   (a) extruding a strip of molten thermoplastic elastomer through an extrusion die to form a molten extrudate that has a generally continuous cross-sectional profile and a length defined by a leading end and a trailing end, where said step of extruding deposits the molten extrudate onto a receiving surface that supports the molten extrudate along the entirety of the length of the extrudate; and, (b) subsequent to (a) and without substantially cooling the molten extrudate and while continuing to support the molten extrudate along the entirety of the length of the extrudate, joining the leading end and the trailing end to form a joint there between by compression molding of the leading and trailing ends at a temperature sufficiently high to allow plastic flow in the area of the joint, wherein the cross-sectional profile of the strip is substantially maintained in the joint.

2. The process of claim 1 wherein the thermoplastic elastomer has a Shore D hardness of not greater than 50 when the thermoplastic elastomer is at room temperature.

3. A process comprising:
(a) extruding a thermoplastic elastomer having a Shore D hardness of not greater than 50 onto a movable fixture to provide an extrudate having a leading end, wherein the extrudate exits an extruder die at a temperature in excess of 375° F., wherein the extrudate has a cross-sectional profile that is maintained during the extrusion process and while the extrudate is positioned on the movable fixture;
(b) interrupting the extruding of the material to produce a trailing end of the extrudate;
(c) moving the fixture during at least a portion of (a) so as to bring the leading end of the extrudate to a predetermined relationship to the trailing end, wherein said step of moving the fixture brings the trailing end in an overlapping position over the leading end; and,
(d) before the extrudate cools to a predetermined cooled temperature, engaging the leading end and the trailing end in a mold heated to a temperature less than about 250° F. under a minimum pressure of 1500 psi to form a joint, wherein an annular member of the material is formed, wherein the thermoplastic elastomer is in its molten state during said step of engaging to thereby allow said step of engaging to create a joint having a cross-sectional profile that is substantially the same as the cross-sectional profile of the extrudate through plastic flow of the molten thermoplastic elastomer.

4. The process of claim 3 wherein (a) includes utilizing a shaped die to impart a predetermined profile to the extrudate.

5. The process of claim 4 wherein (d) includes utilizing the mold to impart the predetermined profile to the joint.

6. The process of claim 3 wherein the annular member in (d) has a minimum inner diameter of at least about 12 inches.

7. The process of claim 3 further comprising:
(e) sufficiently cooling the extrudate to predetermined temperature.

8. The process of claim 3 wherein (c) includes rotating a deposit-receiving surface in supporting connection with the movable fixture substantially 360< about an axis.

9. The process of claim 3 wherein the movable fixture comprises a substantially planar deposit-receiving surface that rotates in a horizontal plane and wherein (a) includes directing the extrudate onto the planar surface while the planar surface rotates.

10. The process of claim 3 wherein the movable fixture comprises a rotatable cylinder having an outer deposit-receiving surface and wherein (a) includes directing the extrudate onto the outer surface while the cylinder rotates.

11. The process of claim 3 further comprising:
(e) positioning the annular member in intermediate relation of two fluid carrying conduits.

12. The process of claim 3 wherein in (a) the movable fixture is a conduit adapted to carry fluids.

13. The process of claim 1, where said step of extruding takes place at an extrudate temperature in excess of 375° F.

14. The process of claim 3, where said step of engaging forms a joint without the need for a vulcanization step.

15. The process of claim 1, where said step of extruding deposits the molten extrudate onto a planar rotating turntable, and where the molten extrudate remains on and is supported by the turntable until and during said step of joining.

16. The process of claim 1, where said step of extruding deposits the molten extrudate onto a rotating cylinder, and where the molten extrudate remains on and is supported by the rotating cylinder until and during said step of joining.

17. The process of claim 1, where said step of extruding takes place at a first location and said step of joining takes place at a second location, the process further comprising the step of moving the receiving surface from the first location to the second location between said steps of extruding and joining.

18. The process comprising:
(i.) extruding a thermoplastic vulcanizate from an extrusion die to form a molten extrudate;
(ii.) depositing the molten extrudate onto a rotating deposit-receiving surface to shape the extrudate into an annular extrudate, where said step of depositing includes contacting a leading edge of the extrudate with a trailing edge of the extrudate to form a joint;
(iii.) after said step of contacting, diverting the molten extrudate while simultaneously moving the annular extrudate away from said extrusion die while maintaining the annular extrudate on the deposit-receiving surface; and
(iv.) after said step of moving the annular extrudate, compression molding the joint while maintaining the annular extrudate on the deposit-receiving surface.

* * * * *